US011075559B2

(12) United States Patent
Yamaguchi et al.

(10) Patent No.: US 11,075,559 B2
(45) Date of Patent: Jul. 27, 2021

(54) STATOR OF ROTATING ELECTRIC MACHINE

(71) Applicant: HONDA MOTOR CO., LTD., Tokyo (JP)

(72) Inventors: Tadashi Yamaguchi, Saitama (JP); Ryutaro Kato, Saitama (JP); Tomohiro Kota, Saitama (JP); Yusuke Kawano, Saitama (JP); Takashi Sugawara, Saitama (JP); Kazuyuki Ohta, Saitama (JP); Tadamichi Sasaki, Saitama (JP); Taisuke Maruyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 16/182,875

(22) Filed: Nov. 7, 2018

(65) Prior Publication Data

US 2019/0149005 A1    May 16, 2019

(30) Foreign Application Priority Data

Nov. 13, 2017    (JP) .............................. JP2017-218177

(51) Int. Cl.
| | |
|---|---|
| *H02K 3/04* | (2006.01) |
| *H02K 3/34* | (2006.01) |
| *H02K 3/28* | (2006.01) |
| *H02K 1/16* | (2006.01) |
| *H02K 15/10* | (2006.01) |

(52) U.S. Cl.
CPC .............. *H02K 3/345* (2013.01); *H02K 1/16* (2013.01); *H02K 3/28* (2013.01); *H02K 15/10* (2013.01)

(58) Field of Classification Search
CPC .................................. H02K 3/345; H02K 3/28
See application file for complete search history.

(56) References Cited

U.S. PATENT DOCUMENTS

| | | | | |
|---|---|---|---|---|
| 8,212,449 | B2 * | 7/2012 | Kouda | H02K 3/345 |
| | | | | 310/215 |
| 9,300,178 | B2 * | 3/2016 | Shiga | H02K 3/345 |
| 10,110,083 | B2 * | 10/2018 | Yoshinori | H02K 3/28 |
| 10,116,181 | B2 * | 10/2018 | Hattori | H02K 3/345 |

(Continued)

FOREIGN PATENT DOCUMENTS

| | | |
|---|---|---|
| CN | 105978204 A | 9/2016 |
| CN | 106100189 A | 11/2016 |

(Continued)

OTHER PUBLICATIONS

May 7, 2020, Chinese Office Action issued for related CN Application No. 201811327971.1.

(Continued)

*Primary Examiner* — Alexander Talpalatski
(74) *Attorney, Agent, or Firm* — Paratus Law Group, PLLC

(57) ABSTRACT

A stator of a rotating electric machine includes a stator core provided with a plurality of slots along a circumferential direction, coils of a plurality of phases distributedly wound around the stator core via the plurality of slots, and an insulating paper disposed between the slot and the coil. The insulating paper has an adhesive portion which fixes the coil to the stator core and a part of the coil of each phase is fixed to the stator core by the adhesive portion.

5 Claims, 10 Drawing Sheets

(56) References Cited

U.S. PATENT DOCUMENTS

| | | | | |
|---|---|---|---|---|
| 2008/0007134 A1* | 1/2008 | Shimura | .................. | H02K 3/44 |
| | | | | 310/214 |
| 2010/0244615 A1 | 9/2010 | Kouda | | |
| 2012/0293037 A1* | 11/2012 | Uchida | .................. | H02K 3/487 |
| | | | | 310/214 |
| 2013/0147307 A1* | 6/2013 | Morooka | .................. | H02K 3/40 |
| | | | | 310/215 |
| 2019/0280549 A1* | 9/2019 | Inoue | ....................... | H02K 1/16 |

FOREIGN PATENT DOCUMENTS

| | | |
|---|---|---|
| CN | 106208572 A | 12/2016 |
| CN | 107112840 A | 8/2017 |
| DE | 102014223205 A1 | 5/2016 |
| GB | 172939 A | 8/1922 |
| JP | 2010-259316 A | 11/2010 |
| JP | 2012-095488 A | 5/2012 |
| JP | 2016-052226 A | 4/2016 |
| JP | 2017-077095 A | 4/2017 |
| JP | 2017-127063 A | 7/2017 |

OTHER PUBLICATIONS

Sep. 3, 2019, Japanese Office Action issued for related JP Application No. 2017-218177.

* cited by examiner

US 11,075,559 B2

STATOR OF ROTATING ELECTRIC MACHINE

CROSS-REFERENCE TO RELATED APPLICATIONS

The present application claims the benefit of priority of Japanese Patent Application No. 2017-218177, filed on Nov. 13, 2017, the content of which is incorporated herein by reference.

TECHNICAL FIELD

The present invention relates to a stator of a rotating electric machine.

BACKGROUND ART

As illustrated in FIG. 8, a stator of a rotating electric machine has a stator core 31 and a coil 32. The stator core 31 has a plurality of teeth 33 which protrude inward in a radial direction (direction of an arrow A) and are arranged along a circumferential direction (direction of an arrow B) and a slot 34 is formed between adjacent teeth 33. The coil 32 is inserted into the slot 34 and an insulating paper 35 is mounted between the coil 32 and a surface 34s forming the slot 34 to surround the coil 32 along an axial direction of the rotating electric machine. Adhesive layers 36 are provided on both surfaces of a region surrounding the coil 32 of the insulating paper 35 (see JP-A-2017-77095). The coil 32 and the insulating paper 35 are fixed by the adhesive layer 36 formed on one surface of the insulating paper 35 and the insulating paper 35 and the surface 34s forming the slot 34 are fixed by the adhesive layer 36 formed on the other surface of the insulating paper 35, in such a manner that it is possible to prevent separation of the insulating paper 35 and to fix the coil 32 to the stator core 31.

However, when an adhesive layer is provided over the entire area surrounding a coil in a slot as similar to a stator of a rotating electric machine of the related art, although the coil, an insulating paper, and a stator core can be reliably integrated, there is a problem that the rigidity of the stator increases, so that NV (Noise Vibration) properties of the rotating electric machine deteriorate.

SUMMARY

The invention provides a stator of a rotating electric machine capable of improving NV properties while a coil and a stator core are integrated via an insulating paper.

The invention provides a stator of a rotating electric machine which includes a stator core provided with a plurality of slots along a circumferential direction, coils of a plurality of phases distributedly wound around the stator core via the plurality of slots, and an insulating paper disposed between the slot and the coil, in which the insulating paper includes an adhesive portion which fixes the coil to the stator core, and a part of the coil of each phase is fixed to the stator core by the adhesive portion.

Effects

According to the invention, since parts of the coils of each phase constituting the distributedly wound coils of the plurality of phases are fixed to the stator core by the adhesive portions provided in the insulating papers, the coils and the stator core can be integrated via the insulating papers.

Further, when the coil is fixed to the stator core over the entire surface of all the slots by the adhesive portion provided on the insulating paper, the rigidity of the stator increases due to a large amount of adhesive material, and thus the NV properties deteriorate. However, when a part of the coil of each phase is fixed to the stator core by the adhesive portion provided in the insulating paper, it is possible to suppress deterioration of the NV properties.

DETAILED DESCRIPTION OF EMBODIMENT

Hereinafter, an embodiment of the invention will be described with reference to the drawings. The drawings are viewed according to a direction of a reference sign.

Figure 1:
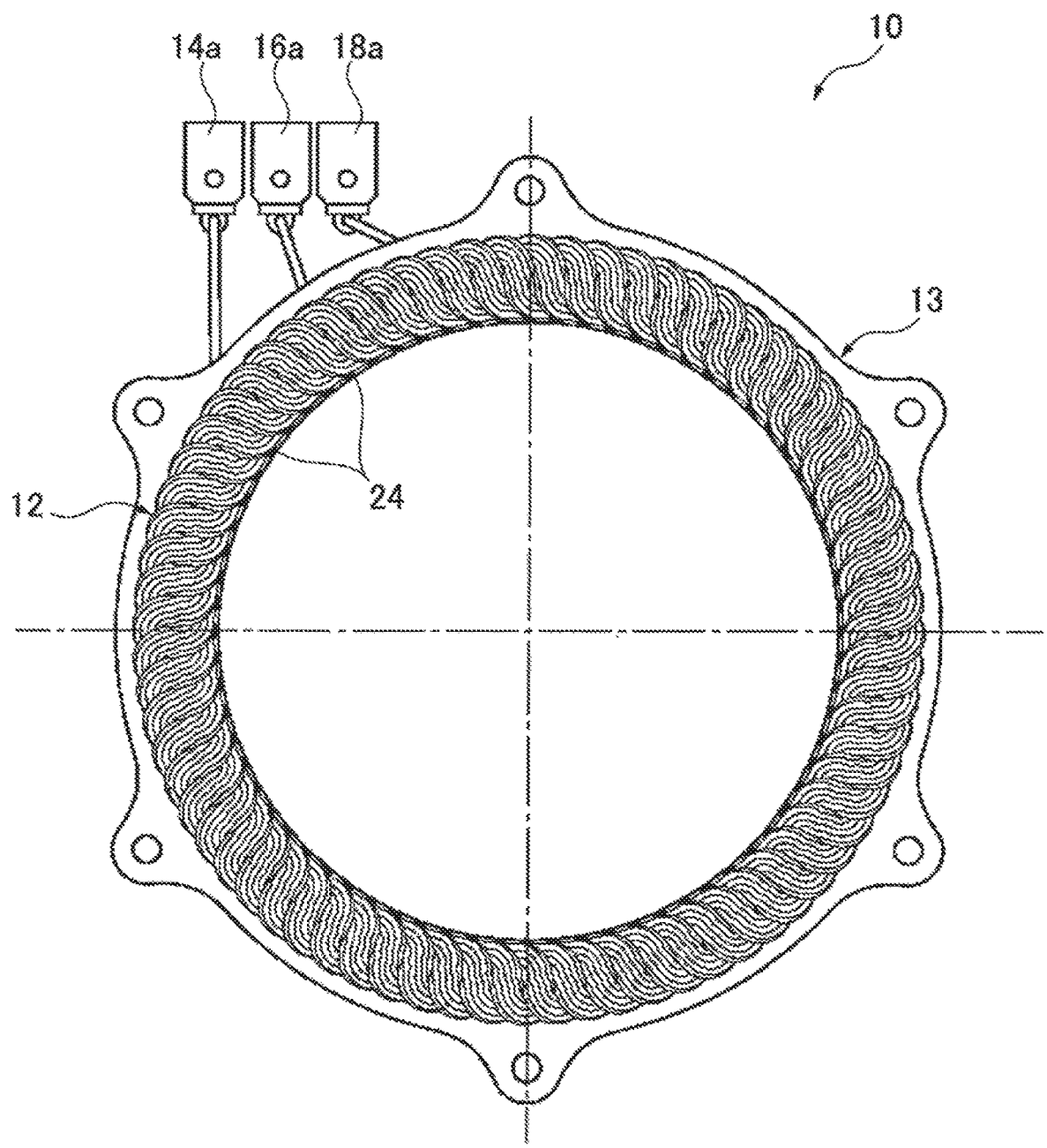
FIG. 1 is a front view of a stator of a rotating electric machine according to an embodiment of the invention.

A rotating electric machine is, for example, a three-phase AC brushless motor and has a stator 10 of an annular shape as illustrated in FIG. 1. In the stator 10, a rotor (not illustrated) is rotatably disposed. In the rotating electric machine, the rotor is driven to rotate based on electric power supplied from a battery (not illustrated) through a U-phase terminal 14a, a V-phase terminal 16a, and a W-phase terminal 18a.

Figure 2:
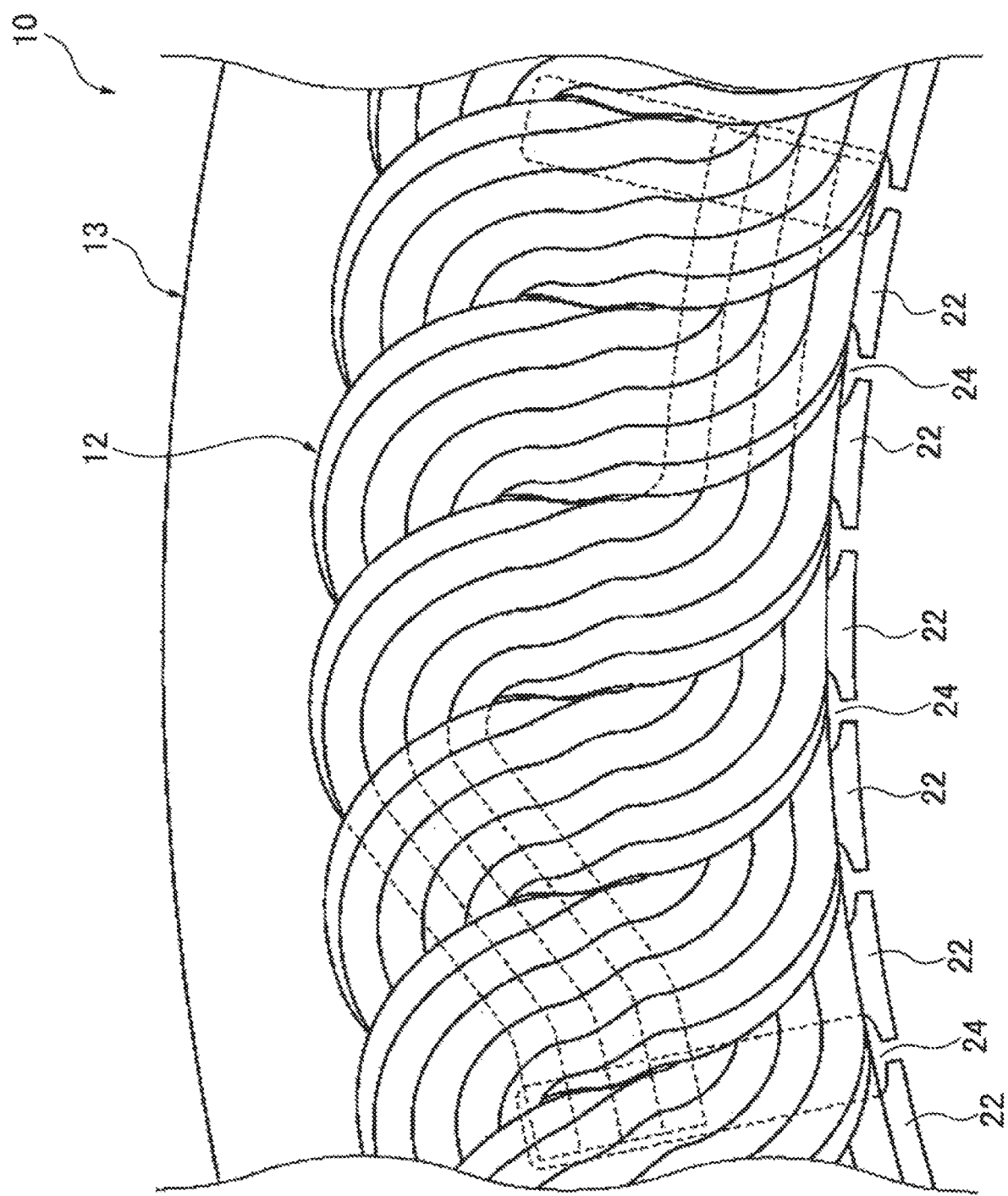
FIG. 2 is a partial enlarged view of the stator of FIG. 1.

Referring also to FIG. 2, the stator 10 is constituted of a stator core 13 of an annular shape and coils 12 wound around the stator core 13. The stator core 13 is provided with a plurality of teeth 22 formed to protrude radially inward from a stator yoke of an annular shape and a plurality of slots 24 formed between adjacent teeth 22. That is, in the stator core 13, the plurality of slots 24 are provided along a circumferential direction. The coils 12 are distributedly wound around the stator core 13 via the plurality of slots 24 and constituted of a U-phase coil 14, a V-phase coil 16, and a W-phase coil 18 which are Y-connected at a neutral point 19.

The coil 12 includes, for example, a plurality of substantially U-shaped segment coils, each of which is constituted of a rectangular conductive plate having a rectangular cross section and has a pair of leg portions connected at a connecting portion and segment coils having the same phase are connected to each other.

One end portion of the U-phase coil 14 is connected to the U-phase terminal 14a and first to third coil portions U1, U2, and U3 are connected in series from one end portion connected with the U-phase terminal 14a toward the neutral point 19. One end portion of the V-phase coil 16 is connected to the V-phase terminal 16a and first to third coil portions V1, V2, and V3 are connected in series from one end portion connected with the V-phase terminal 16a toward the neutral point 19. One end portion of the W-phase coil 18 is connected to the W-phase terminal 18a and first to third coil portions W1, W2, and W3 are connected in series from one end portion connected with the W-phase terminal 18a toward the neutral point 19.

Figure 4:
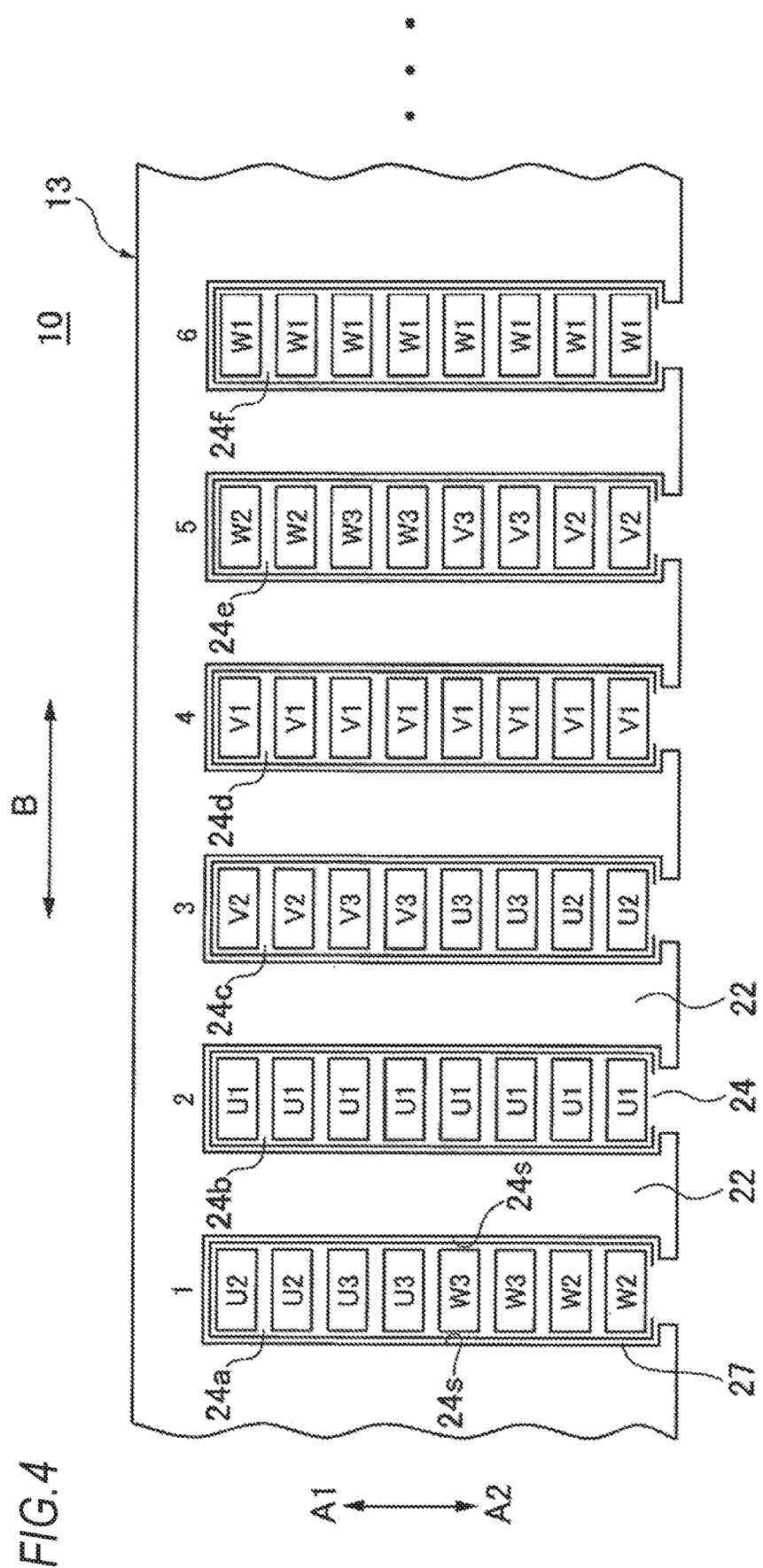
FIG. 4 is a schematic diagram illustrating an example of arrangement of a U-phase coil, a V-phase coil, and a W-phase coil constituting the stator of FIG. 1.

Next, an example of the arrangement of the U-phase coil 14, the V-phase coil 16, and the W-phase coil 18 for each slot of the stator 10 will be described with reference to FIG. 4. FIG. 4 is a conceptual diagram in which teeth 11 aligned in the circumferential direction in the stator 10 illustrated in FIG. 1 are linearly developed and a first slot 24a, a second slot 24b, . . . , are sequentially assigned from the left slot. As illustrated in FIG. 4, leg portions of, for example, eight coils 12 having a rectangular cross section are arranged overlapping in a radial direction (direction of arrows A1-A2) in each slot 24.

Only the first coil portions U1 of the U-phase coils 14 are arranged in a second slot 24b and only the first coil portions V1 of the V-phase coils 16 are arranged in a fourth slot 24d, and further only the first coil portions W1 of the W-phase coils 18 are arranged in a sixth slot 24f.

In a first slot 24a, the second and third coil portions U2 and U3 of the U-phase coils 14 and the second and third coil portions W2 and W3 of the W-phase coils 18 are arranged. The U-phase coils 14 are arranged on an outer circumferential side (direction of the arrow A1) of the first slot 24a and the W-phase coils 18 are arranged on an inner circumferential side (direction of the arrow A2) in the first slot 24a.

In a third slot 24c, the second and third coil portions U2 and U3 of the U-phase coils 14 and the second and third coil portions V2 and V3 of the V-phase coils 16 are arranged. The V-phase coils 16 are arranged on an outer circumferential side (direction of the arrow A1) of the third slot 24c and the U-phase coils 14 are arranged on an inner circumferential side (direction of the arrow A2) in the third slot 24c.

In a fifth slot 24e, the second and third coil portions V2 and V3 of the V-phase coils 16 and the second and third coil portions W2 and W3 of the W-phase coils 18 are arranged. The W-phase coils 16 are arranged on an outer circumferential side (direction of the arrow A1) of the fifth slot 24e and the V-phase coils 16 are arranged on an inner circumferential side (direction of the arrow A2) in the fifth slot 24e. For slots subsequent to the sixth slot, the same arrangement of coils as the first to fifth slots is repeated.

Between the coil 12 in the slot 24 and a surface 24s forming the slot 24, an insulating paper 27 is arranged along an axial direction of the rotating electric machine. The insulating paper 27 is arranged to surround the eight coils 12 in the slot 24.

Here, the insulating paper 7 is provided with adhesive portions 28 with a base material interposed therebetween. The adhesive portion 28 is formed by applying, for example, an epoxy based foamed resin material and, in a condition where the insulating paper 27 is placed in the slot 24, the adhesive portion 28 adheres to the opposing coil 12 and the surface 24s forming the slot 24. Therefore, the coil 12 is fixed to stator core 13. However, when the coils 12 of respective phases are fixed to the stator core 13 by the adhesive portion 28 over the entire surfaces of all the slots 24, the rigidity of the stator 10 increases, and thus the NV properties deteriorate.

Therefore, a part of the coil of each phase is fixed to the stator core 13 by the adhesive portion 28. By fixing a part of the coil of each phase to the stator core 13 by the adhesive portion 28, the coil 12 and the stator core 13 can be integrated via the insulating paper 27. Also, when the coil 12 is fixed to the stator core 13 over the entire surfaces of all the slots 24 by the adhesive portions 28 provided on the insulating papers 27, the rigidity of the stator 10 increases due to a large amount of adhesive material, whereby the NV properties deteriorate. However, when a part of the coil 12 of each phase is fixed to the stator core 13 by the adhesive portion 28 provided in the insulating paper 27, it is possible to prevent the deterioration of the NV properties. Furthermore, the amount of the adhesive material can be reduced and the possibility that the base material peels off when the insulating paper 27 is inserted into the slot 24 can be reduced.

Further, when the coil 12 of each phase has a plurality of coil portions U1 to U3 (V1 to V3 and W1 to W3) connected in series, it is preferable that a part of each of the coil portions U1 to U3 (V1 to V3 and W1 to W3) are fixed to the stator core 13 by the adhesive portion 28. Therefore, the coil 12 of each phase can be further reliably fixed to the stator core 13.

Figure 3:
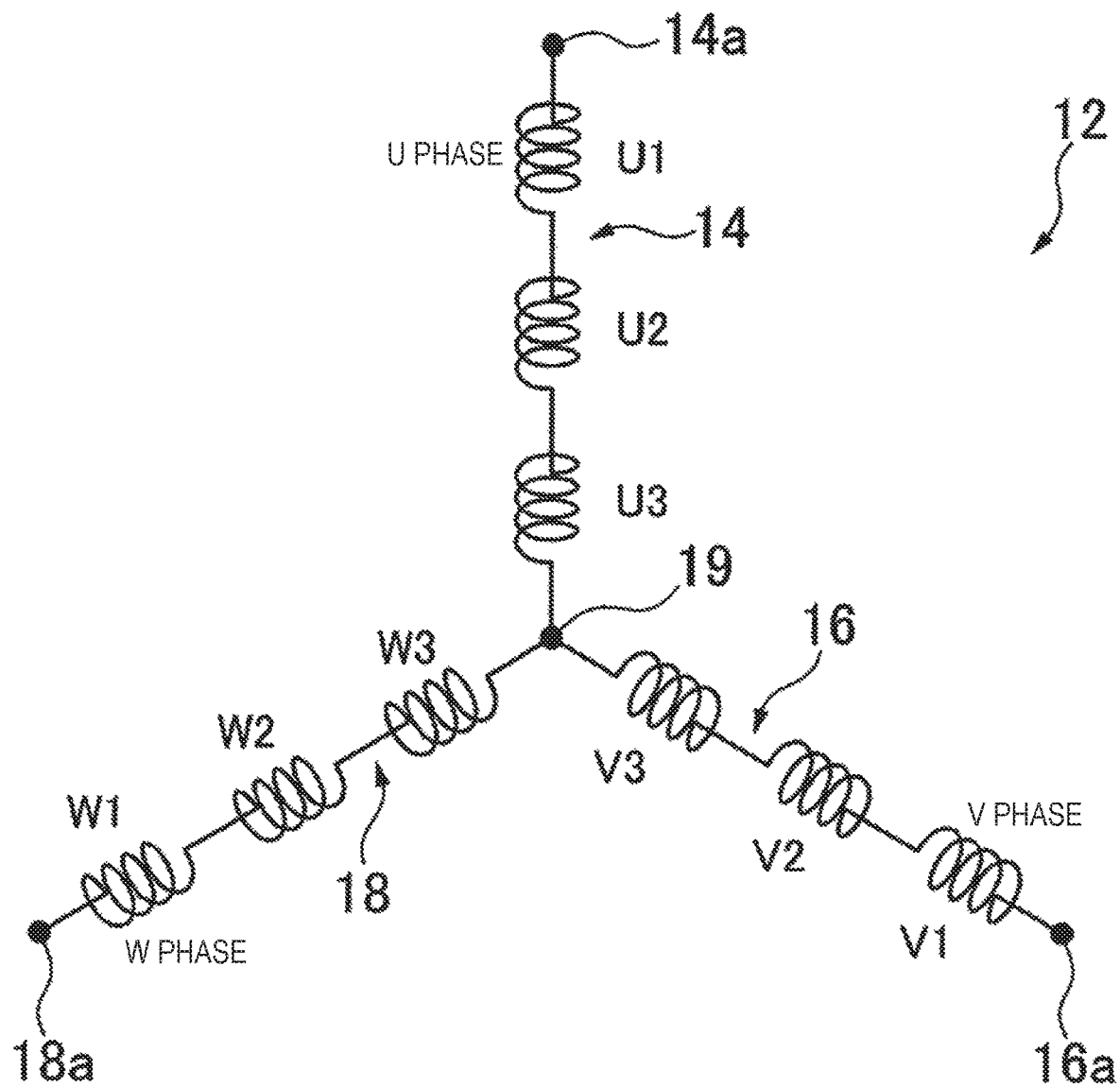
FIG. 3 is a circuit diagram illustrating an example of a circuit of coils constituting the stator of FIG. 1.

In FIG. 3, a case where the first to third coil portions U1 to U3 (V1 to V3 and W1 to W3) are connected in series from one end portion connected with a terminal of each phase to the other end portion (neutral point 19) is exemplified. However, it is not limited thereto and the coil portions may be connected in parallel from one end portion connected with the terminal of each phase to the other end portion (neutral point 19). In this case, it is also preferable that a part of each coil portion is fixed to the stator core 13 by the adhesive portion 28. Therefore, the coil 12 of each phase can be further reliably fixed to the stator core 13.

Figure 5:
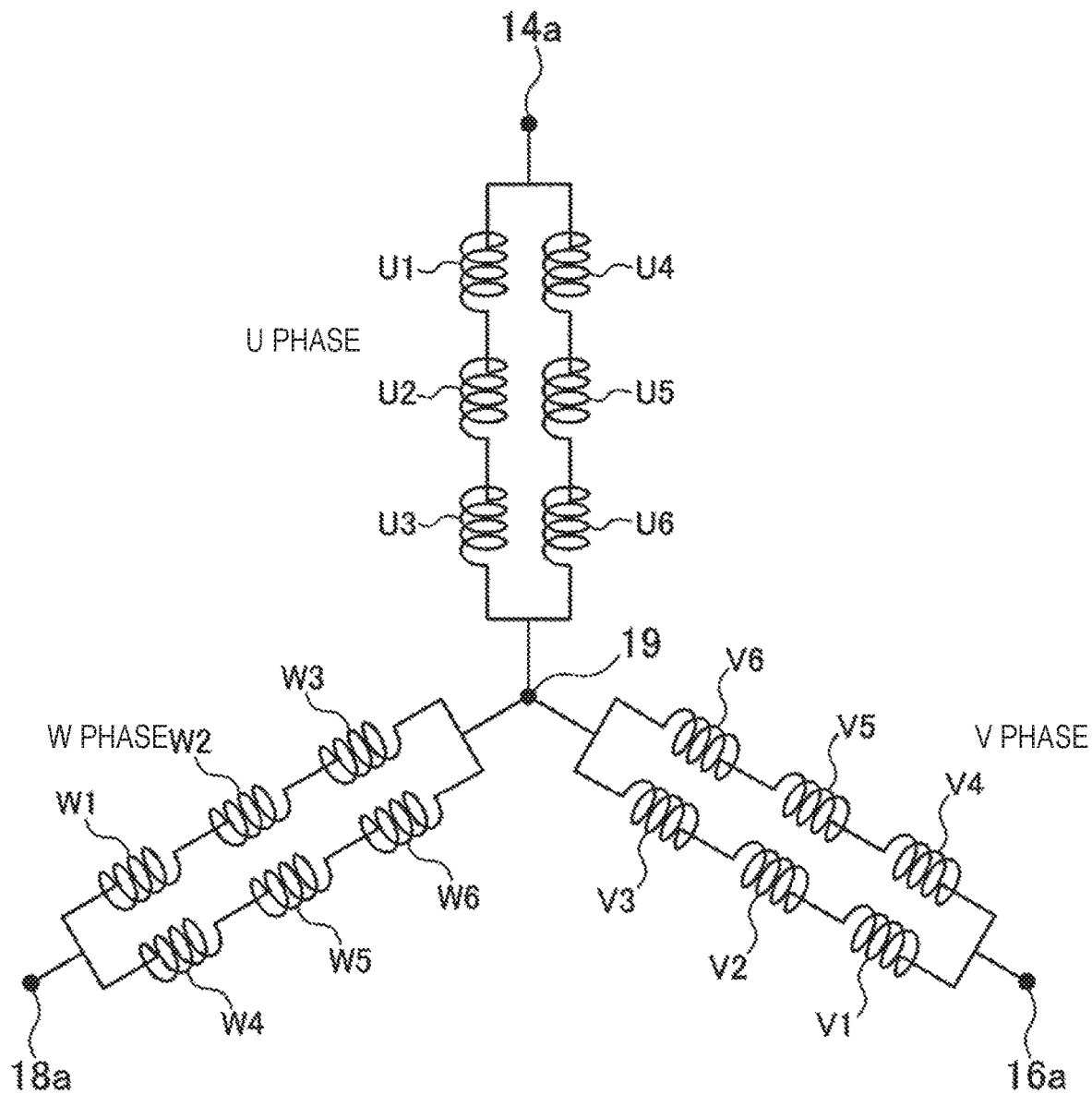
FIG. 5 is a circuit diagram illustrating another example of a circuit of coils constituting the stator of FIG. 1.

FIG. 5 illustrates an example where, in the coil of each phase, the first to third coil portions U1 to U3 (V1 to V3 and W1 to W3) are connected in series and the fourth to sixth coil portions U4 to U6 (V4 to V6 and W4 to W6) are connected in series, and further, the first to third coil portions U1 to U3 (V1 to V3 and W1 to W3) and the fourth to sixth coil portions U4 to U6 (V4 to V6 and W4 to W6) are connected in parallel. In this case, a part of the coil 12 of each phase may also be fixed to the stator core 13 by the adhesive portion 28 and it is preferable that parts of the first to third coil portions U1 to U3 (V1 to V3 and W1 to W3) are fixed to the stator core 13 by the adhesive portion 28 and parts of the fourth to sixth coil portions U4 to U6 (V4 to V6 and W4 to W6) are fixed to the stator core 13 by the adhesive portion 28. Further, it is further preferable that parts of the coil portions of the first to sixth coil portions U1 to U6 (V1 to V6 and W1 to W6) are fixed to the stator core 13 by the adhesive portion 28. Hereinafter, the arrangement of the adhesive portion 28 will be described.

First Example

Figure 6A:
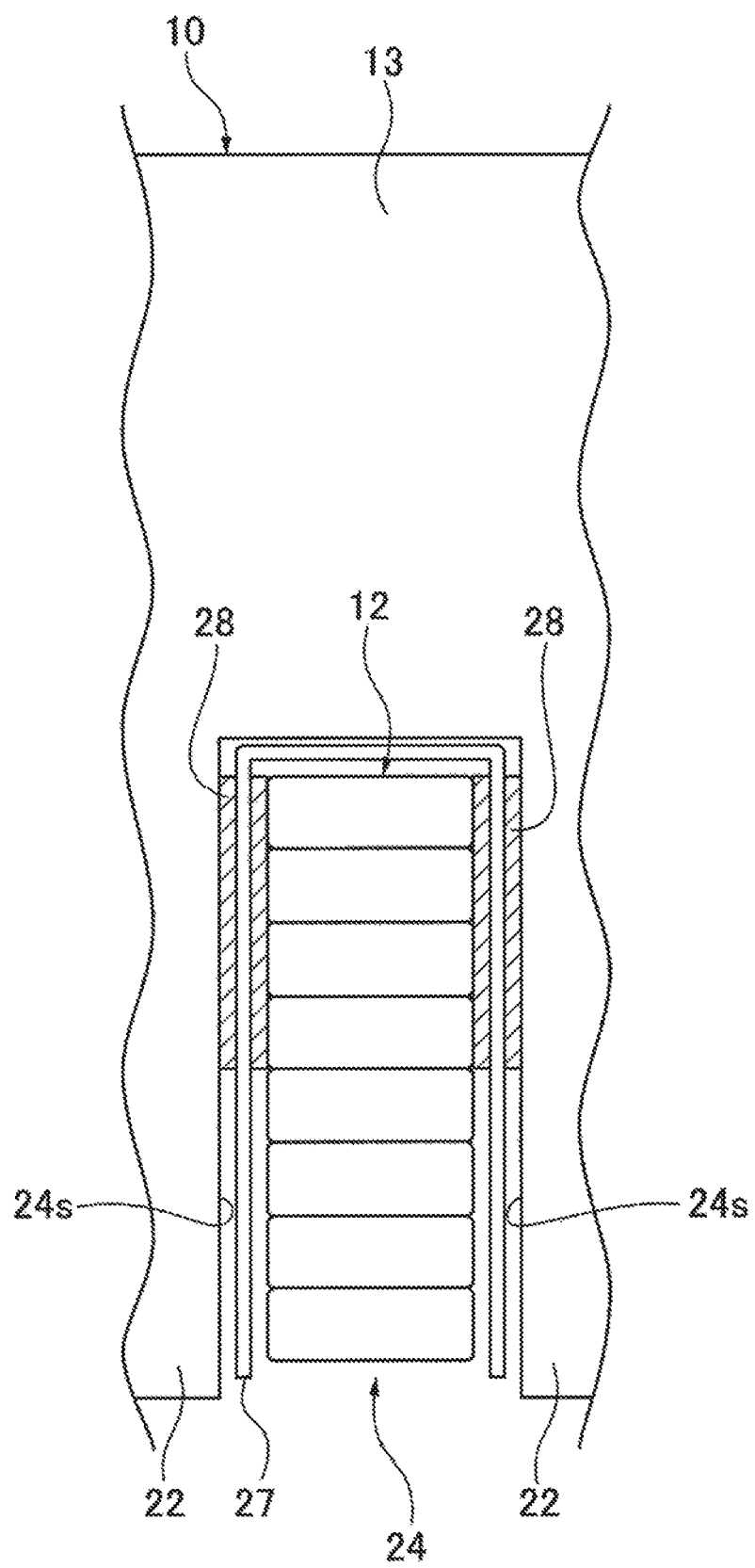
FIG. 6A is an enlarged view of a slot illustrating an example of arrangement of an adhesive portion.

As illustrated in FIG. 6A, a first example is an example in which four coils 12 located on an outer diameter side of the slot 24 are fixed to the stator core 13 by the adhesive portion 28 provided on the insulating paper 27.

Second Example

Figure 6B:
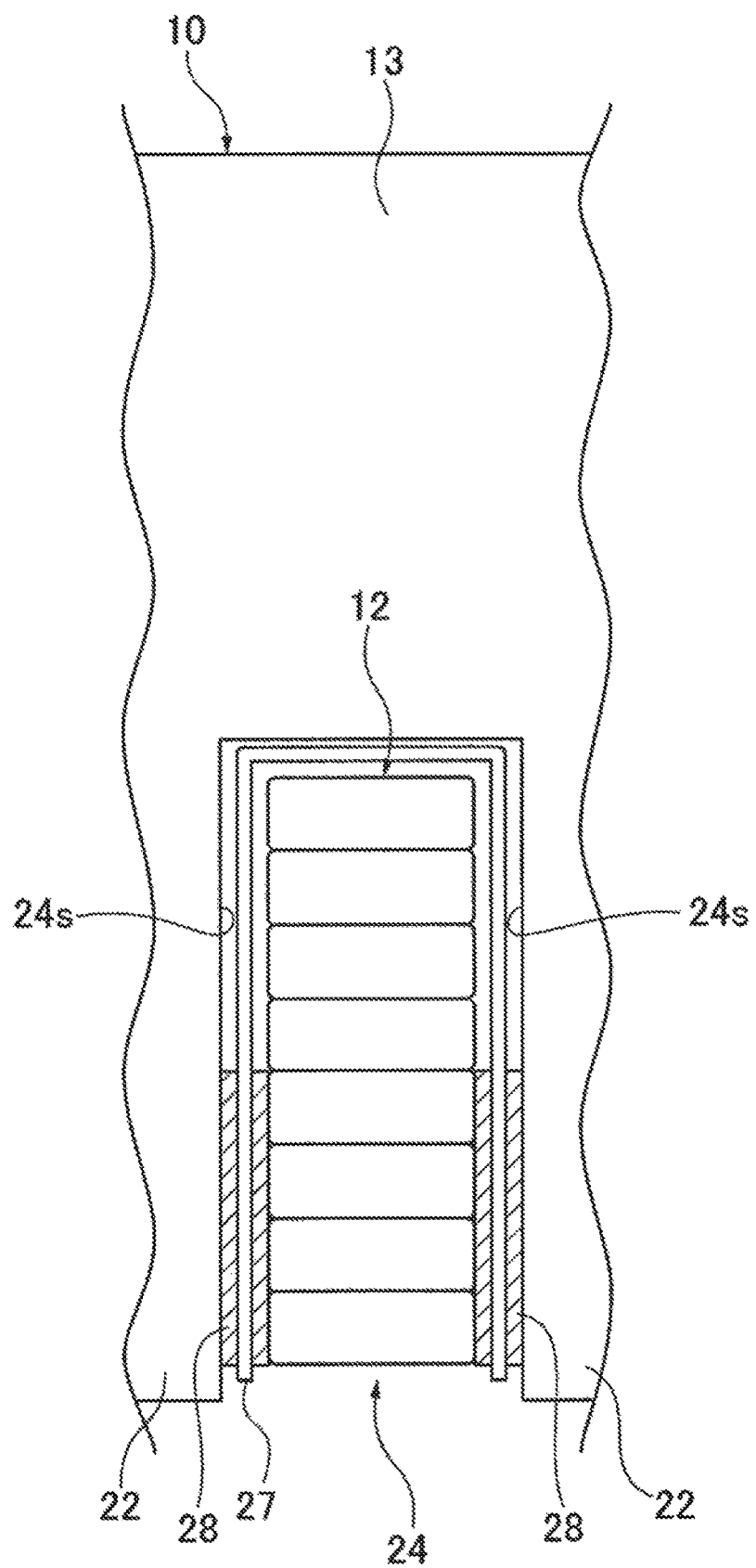
FIG. 6B is an enlarged view of the slot illustrating another example of the arrangement of the adhesive portion.

As illustrated in FIG. 6B, a second example is an example in which four coils 12 located on an inner diameter side of the slot 24 are fixed to the stator core 13 by the adhesive portion 28 provided on the insulating paper 27.

Third Example

Figure 6C:
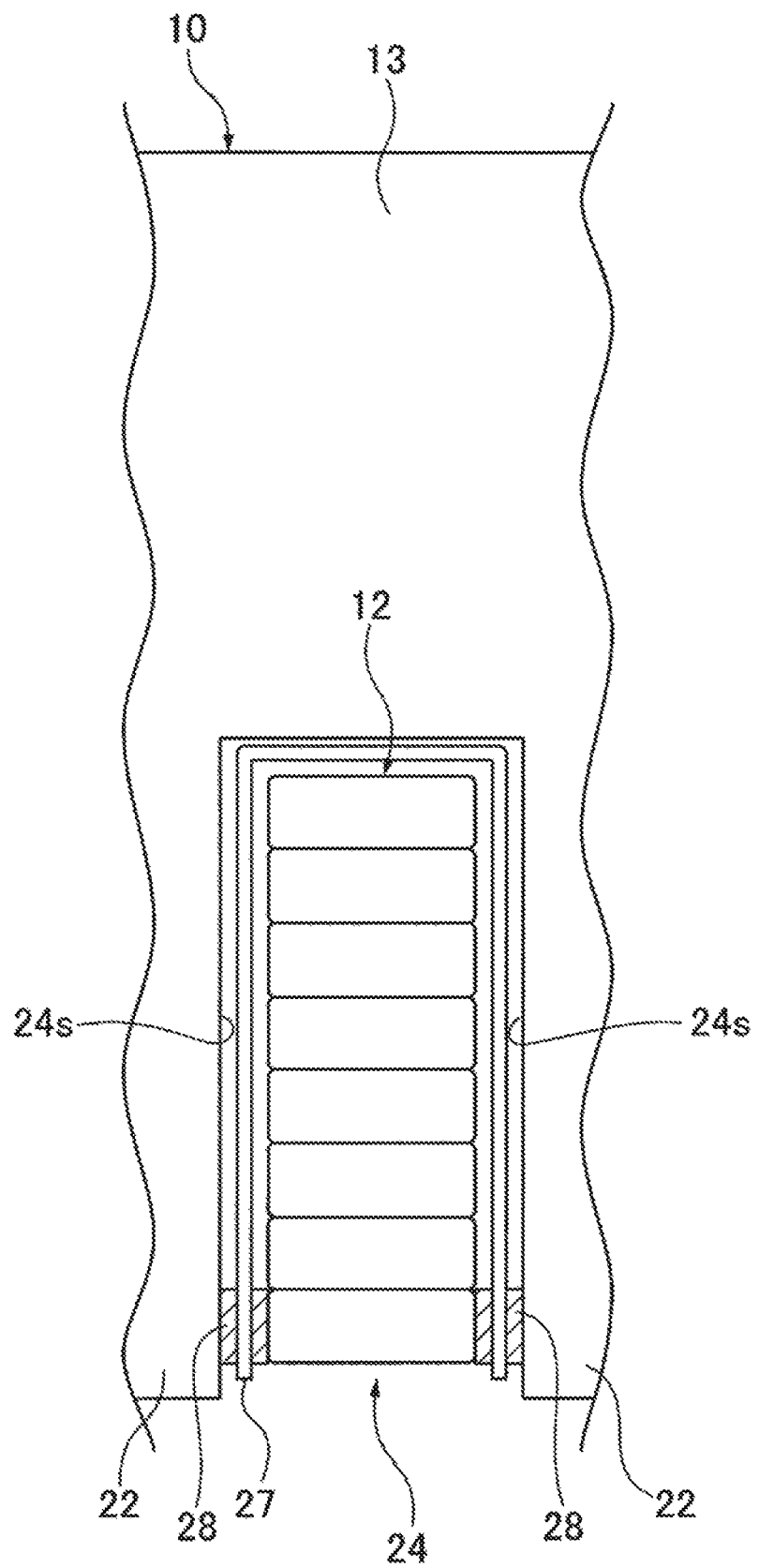
FIG. 6C is an enlarged view of the slot illustrating yet another example of the arrangement of the adhesive portion.
Figure 7:
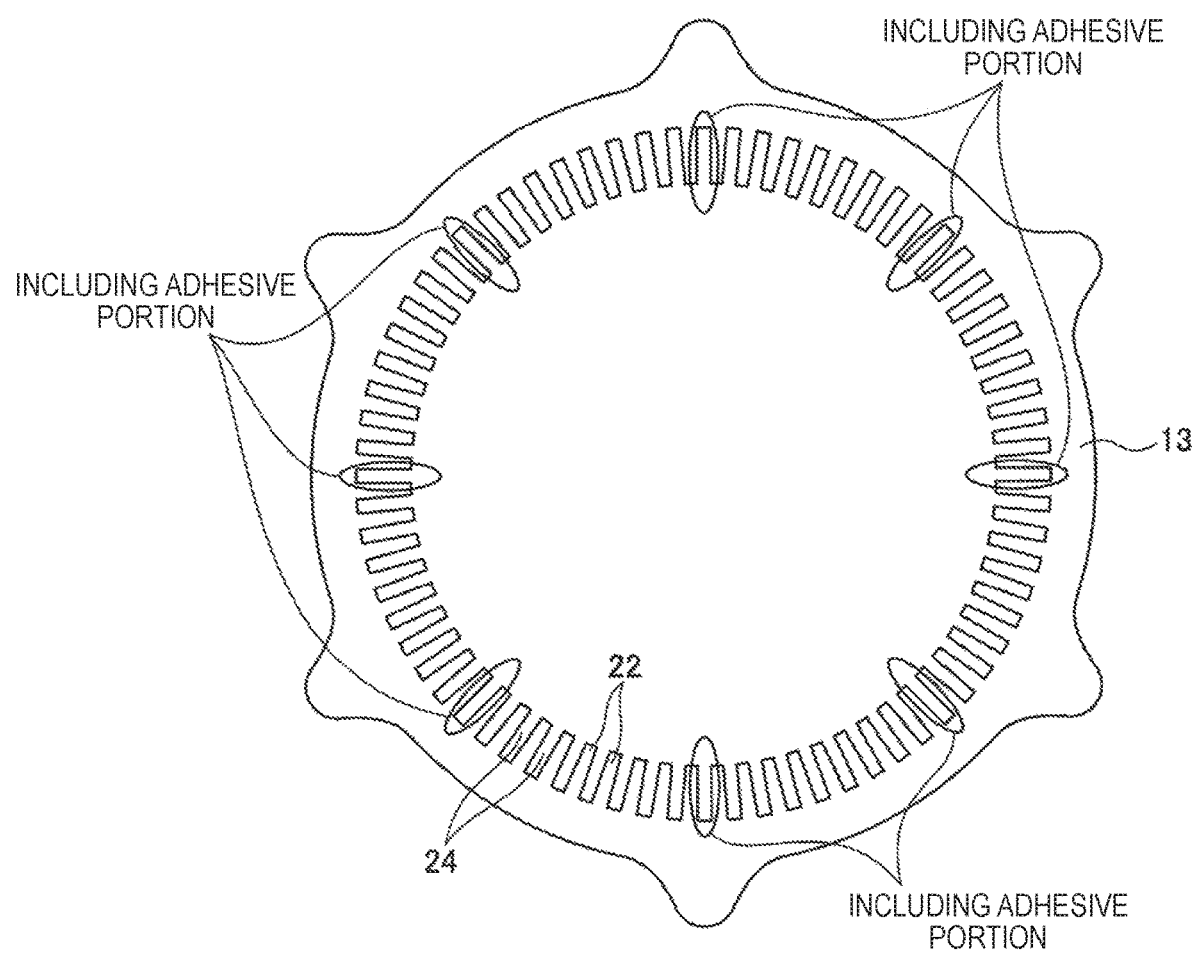
FIG. 7 is a front view of a stator core illustrating an example of arrangement of insulating papers provided with the adhesive portions.
Figure 8:
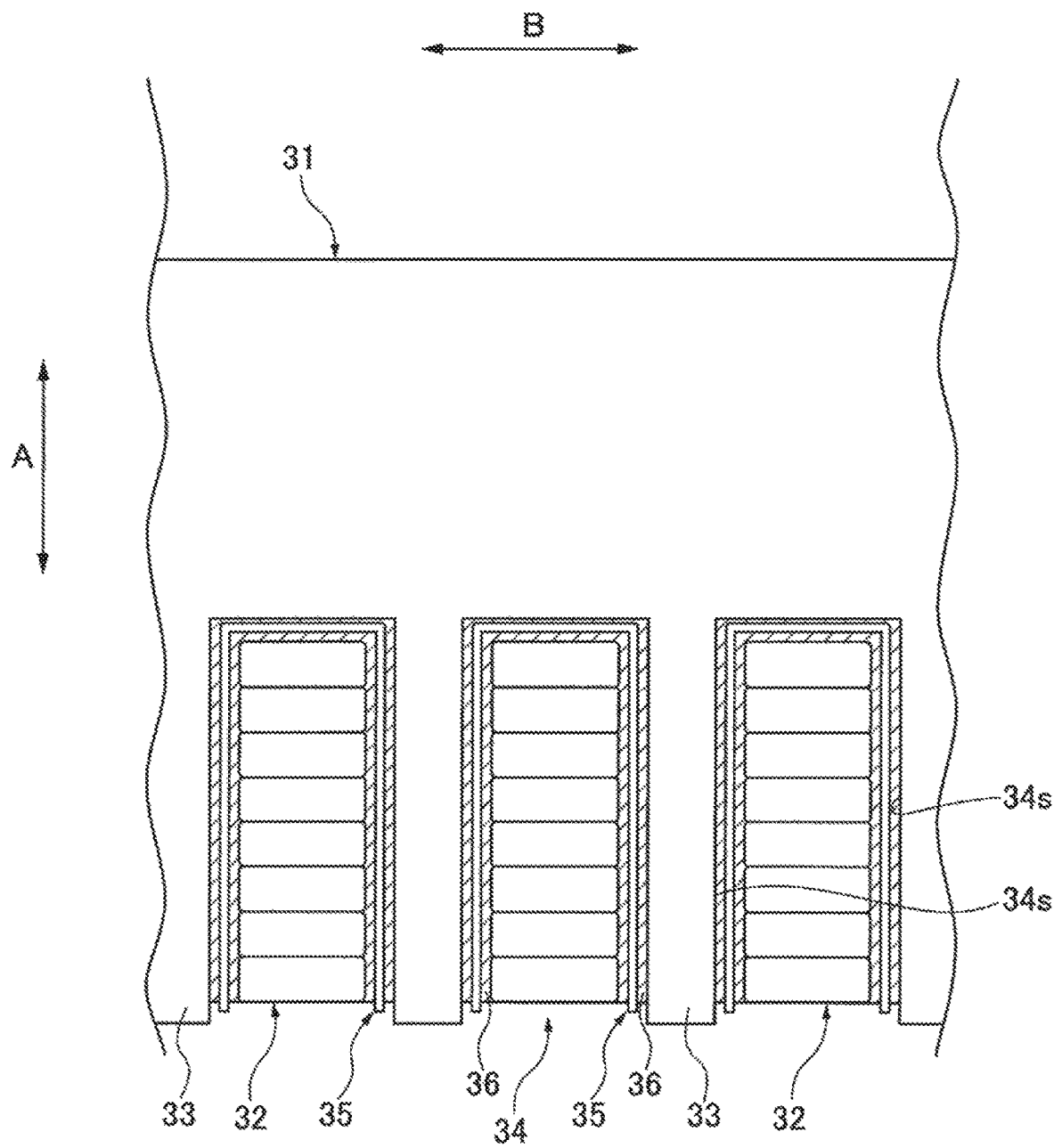
FIG. 8 is a developed view of a stator in which teeth aligned in a circumferential direction in the stator or the related art are linearly deployed.

As illustrated in FIG. 6C, a third example is an example in which only one coil 12 located on the innermost diameter side of the slot 24 is fixed to the stator core 13 by the adhesive portion 28 provided on the insulating paper 27. In the first to third examples, only some coils 12 among the plurality of coils 12 arranged in the slot 24 are fixed to the stator core 13 by the adhesive portion 28. Therefore, it is possible to reduce transmission of the vibration from the coil 12 to the stator core 13. The number and location of coils 12 fixed to the stator core 13 by the adhesive portion 28 can be appropriately changed.

Fourth Example

In a fourth example, the slots 24 disposed with the insulating paper 27 including the adhesive portion 28 as in the first to third examples, are surrounded in a circle form. As described above, it is not necessary to arrange the insulating paper 27 including the adhesive portion 28 on all the slots 24. In this case, the coil 12 of each phase is fixed to the stator core 13 by the adhesive portion 28 only in some slots 24 among the plurality of slots 24 through which the coil 12 passes. In the other slot 24, it is sufficient to dispose the insulating paper 27 where the adhesive portion 28 is not provided therewith.

The insulating paper 27 provided with the adhesive portion 28 may be disposed in any one or more slots 24. When the insulating papers 27 provided with the adhesive portions 28 are disposed in a plurality of slots 24, it is preferable that the insulating papers 27 provided with the adhesive portions 28 are provided at equal intervals in the circumferential direction. Therefore, it is easy to manage at the time of arranging the insulating papers 27.

The invention is not limited to the embodiment described above and may be appropriately modified, improved, and the like. For example, instead of providing the adhesive portion 28 in advance on the insulating paper 27, the adhesive portion 28 may be formed by pouring adhesive in the axial direction into the insulating paper 27 provided in the slot 24.

Further, FIG. 4 illustrates an example of the arrangement of the coils 12 of each phase. The arrangement of the coils 12 of each phase can be appropriately changed and the number of coils 12 arranged in the slot 24 can be appropriately set.

As described above, the following configurations are disclosed in this description. A corresponding constituent element or the like in the embodiment described above is illustrated in parentheses. However, it is not limited thereto.

(1) A stator (stator 10) of a rotating electric machine which includes a stator core (stator core 13) provided with a plurality of slots (slots 24) along a circumferential direction, coil (coil 12) of a plurality of phases distributedly wound around the stator core via the plurality of slots, and an insulating paper (insulating paper 27) disposed between the slot and the coil, in which
the insulating paper includes an adhesive portion (adhesive portion 28) which fixes the coil to the stator core, and
a part of the coil of each phase is fixed to the stator core by the adhesive portion.

According to (1), since parts of the coils of each phase constituting the distributedly wound coils of the plurality of phases are fixed to the stator core by the adhesive portions provided in the insulating papers, the coils and the stator core can be integrated via the insulating papers. Further, when the coil is fixed to the stator core over the entire surface of all the slots by the adhesive portion provided on the insulating paper, the rigidity of the stator increases due to a large amount of adhesive material, and thus the NV properties deteriorate. However, when a part of the coil of each phase is fixed to the stator core by the adhesive portion provided in the insulating paper, it is possible to suppress deterioration of the NV properties. Furthermore, the amount of the adhesive can be reduced and the possibility that the base material peels off when the insulating paper is inserted into the slot can be reduced.

(2) The stator of a rotating electric machine according to configuration (1), in which
the coil includes coils of three phases which are Y-connected at a neutral point (neutral point 19),
the coil of each phase has a plurality of coil portions (U1 to U2, V1 to V3, and W1 to W3) connected in series, and
a part of each coil portion is fixed to the stator core by the adhesive portion.

According to configuration (2), parts of the plurality of coil portions connected in series are fixed to the stator core by the adhesive portion, in such a manner that the coils of each phase can be further reliably fixed to the stator core.

(3) The stator of a rotating electric machine according to configuration (1) or (2), in which
the coil includes coils of three phases which are Y-connected at a neutral point (neutral point 19),
the coil of each phase has a plurality of coil portions (U1 to U6, V1 to V6, and W1 to W6) connected in parallel, and
a part of each coil portion is fixed to the stator core by the adhesive portion.

According to configuration (3), parts of the plurality of coil portions connected in parallel are fixed to the stator core by the adhesive portion, in such a manner that the coils of each phase can be further reliably fixed to the stator core.

(4) The stator of a rotating electric machine according to any one of configurations (1) to (3), in which
the coil of each phase is fixed to the stator core by the adhesive portion only in some slots among the plurality of slots through which the coil passes.

According to configuration (4), since the coil of each phase is fixed to the stator core by the adhesive portion only in some slots among the plurality of slots through which the coil passes.

(5) The stator of a rotating electric machine according to configuration (4), in which
the slots, in which the insulating papers provided with the adhesive portions are disposed, are provided at equal intervals in the circumferential direction.

According to configuration (5), since the insulating papers provided with the adhesive portions are provided at equal intervals in the circumferential direction, it is easy to manage at the time of arranging the insulating papers.

(6) The stator of a rotating electric machine according to any one of configurations (1) to (3), in which
a plurality of coils are arranged in each slot, and
only some coils among the plurality of coils are fixed to the stator core by the adhesive portion.

According to configuration (6), since only some coils among the plurality of coils arranged in the slot are fixed to the stator core by the adhesive portion, it is possible to reduce transmission of the vibration from the coil to the stator core.

The invention claimed is:

1. A stator of a rotating electric machine comprising:
   a stator core provided with a plurality of slots along a circumferential direction,
   coil of a plurality of phases distributedly wound around the stator core via the plurality of slots,
   an insulating paper disposed between the slot and the coil, wherein
   a plurality of coils are arranged in each slot so as to overlap in a radial direction,
   the insulating paper includes an adhesive portion which fixes the coil to the stator core,
   the insulating paper extends from a same position in the radial direction as an innermost diameter portion of the coil or from an inner side in the radial direction than the innermost diameter portion of the coil to a same position in the radial direction as an outermost diameter portion of the coil or to an outer side in the radial direction than the outermost diameter portion of the coil,
   the adhesive portion is provided only on a part of the insulating paper, and
   in a cross section perpendicular to the axial direction, only some of the plurality of coils, arranged in the slot, is fixed to the stator core by the adhesive portion on a side surface in the circumferential direction.

2. The stator of a rotating electric machine according to claim 1, wherein
   the coil includes coils of three phases which are Y-connected at a neutral point,
   the coil of each phase includes a plurality of coil portions connected in series, and
   a part of each coil portion is fixed to the stator core by the adhesive portion.

3. The stator of a rotating electric machine according to claim 1, wherein
   the coil includes coils of three phases which are Y-connected at a neutral point,
   the coil of each phase includes a plurality of coil portions connected in parallel, and
   a part of each coil portion is fixed to the stator core by the adhesive portion.

4. The stator of a rotating electric machine according to claim 1, wherein
   the coil of each phase is fixed to the stator core by the adhesive portion only in some slots among the plurality of slots through which the coil passes.

5. The stator of a rotating electric machine according to claim 4, wherein
   the slots, in which the insulating papers provided with the adhesive portions are disposed, are provided at equal intervals in the circumferential direction.

* * * * *